US007040442B2

(12) United States Patent
McWhorter

(10) Patent No.: US 7,040,442 B2
(45) Date of Patent: May 9, 2006

(54) MOTORCYCLE FOOT CONTROLS

(76) Inventor: Cory McWhorter, 936 Cory La., Saint Cloud, MN (US) 56303

( * ) Notice: Subject to any disclaimer, the term of this patent is extended or adjusted under 35 U.S.C. 154(b) by 0 days.

(21) Appl. No.: 10/854,921

(22) Filed: May 27, 2004

(65) Prior Publication Data
US 2005/0263335 A1 Dec. 1, 2005

(51) Int. Cl.
*B62J 25/00* (2006.01)
(52) U.S. Cl. ..................... 180/219; 280/291
(58) Field of Classification Search ............... 180/219; 280/291, 293, 294; 74/564
See application file for complete search history.

(56) References Cited
U.S. PATENT DOCUMENTS 4,470,321 A * 9/1984 Girty ..................... 74/473.16
4,633,727 A * 1/1987 Pike ...................... 74/473.17
5,720,359 A * 2/1998 Attenello ................ 180/219
6,945,376 B1 * 9/2005 Hunter ................... 192/99 S

* cited by examiner

*Primary Examiner*—Lesley D. Morris
*Assistant Examiner*—L. Lum
(74) *Attorney, Agent, or Firm*—Schwegman, Lundberg, Woessner & Kluth, P.A.

(57) ABSTRACT

A motorcycle is described which includes adjustable foot controls to accommodate different rider sizes. The adjustable rear brake pedal assembly for a motorcycle includes a base plate, a brake pedal and a foot rest attached to a first motorcycle frame stud via a threaded connector. An adjustable rear brake pedal assembly for the motorcycle includes a base plate, a brake pedal and a foot rest attached to a second motorcycle frame stud via a threaded connector. Each base plates includes a groove on its inward side that is sized to accept its respective motorcycle frame stud and to allow the base plate to be selectively positioned relative to threaded holes spaced along the motorcycle frame studs.

5 Claims, 6 Drawing Sheets

MOTORCYCLE FOOT CONTROLS

FIELD OF THE INVENTION

The present invention relates to motorcycle foot controls. More particularly the present invention relates to foot controls having adjustability for different riders' physical characteristics.

BACKGROUND OF THE INVENTION

Motorcycles are powered by an engine having an output shaft coupled to a drive mechanism through a transmission. The transmission features a variety of gear ratios that can be selectively engaged by a rider during operation. The output of the transmission drives a rear wheel. Motorcycles typically include a gear shifter to allow the rider to manually shift the gears of the transmission. As know to those in the art, the manual gear shifter is usually located on the motorcycle for operation by the rider's left foot. In addition to the gear shifter a rear brake control is usually located on the motorcycle for operation by the rider's right foot. One problem with the foot operated motorcycle controls is locating the controls for operation by different sized riders. That is, leg length and rider position vary dramatically such that safe and comfortable operation of the motorcycle can be compromised. What is desired are motorcycle foot controls that can be adjusted for rider size differences.

BRIEF SUMMARY OF THE INVENTION

In one embodiment, an adjustable rear brake pedal assembly for a motorcycle comprises a base plate having an inward and an outward side and a brake pedal attached to the outward side of the base plate, and a foot rest attached to a motorcycle frame stud via a threaded connector. The foot rest is located on the outward side of the base plate such that the base plate is located between the motorcycle frame stud and the foot rest. The base plate includes a groove on its inward side that is sized to accept the motorcycle frame stud and to allow the base plate to be selectively positioned relative to threaded holes spaced along the motorcycle frame stud.

In another embodiment, an adjustable rear brake pedal assembly for a motorcycle comprises a base plate having an inward and an outward side, a brake pedal attached to the outward side of the base plate, and a foot rest attached to a motorcycle frame stud via a threaded connector. The foot rest is located on the outward side of the base plate such that the base plate is located between the motorcycle frame stud and the foot rest. The base plate includes a groove on its inward side that is sized to accept the motorcycle frame stud and to allow the base plate to be selectively positioned relative to threaded holes spaced along the motorcycle frame stud.

These and other features of the invention will be more apparent from the following detailed description that is provided in connection with the accompanying drawings and illustrated exemplary embodiments of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural changes may be made without departing from the present invention.

Figure 1A:
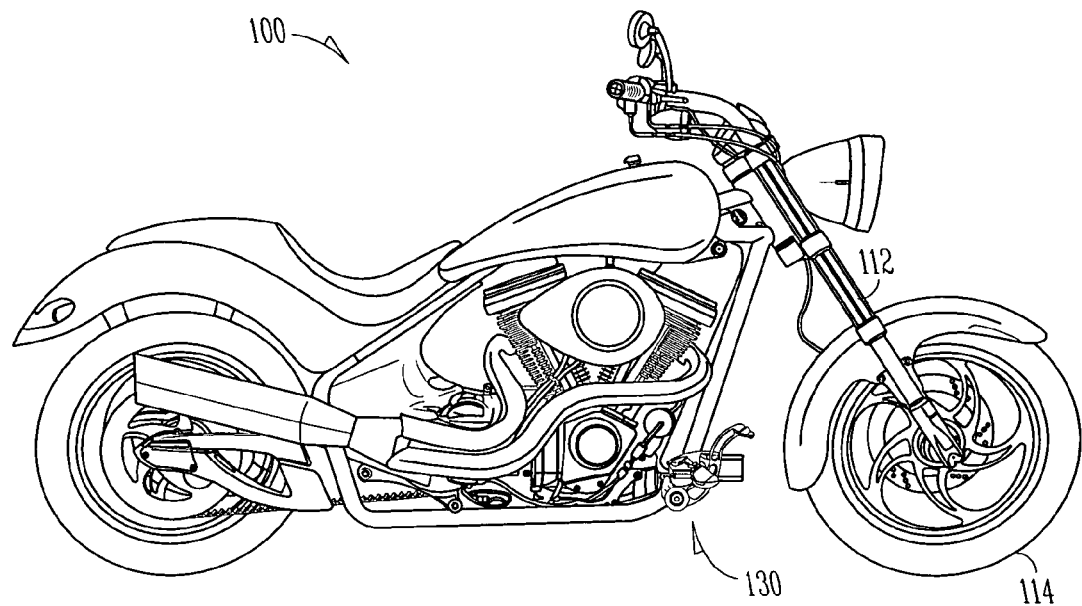
FIGS. 1A and 1B illustrate a motorcycle of an embodiment of the present invention.
Figure 1B:
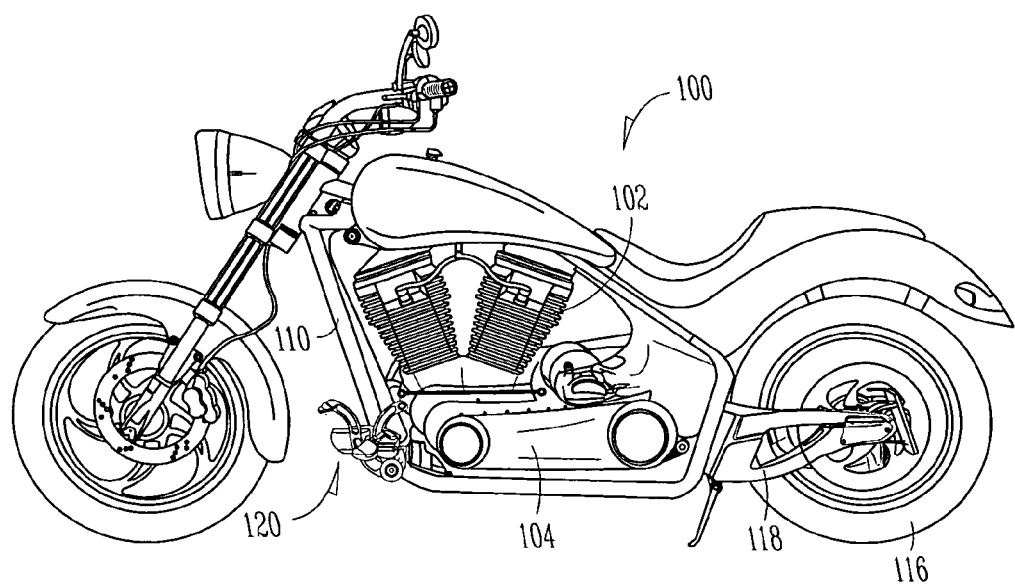

With reference initially to FIGS. 1A and 1B, a motorcycle 100 of one embodiment of the present invention is illustrated in side views. The motorcycle is powered by an engine 102 through a transmission 104 and drive train, which is constructed in accordance with embodiments of the present invention. As is known to those of ordinary skill in the art, the motorcycle is generally comprised of a frame 110 assembly upon which the engine is attached. This frame assembly also supports a front fork 112 to which a front wheel 114 is mounted. A rear wheel 116 is mounted to the frame 110 assembly in any suitable manner. The rear wheel is preferably attached to the frame assembly through the use of a rear swing arm 118.

As illustrated in FIG. 1B a gear shift foot control 120 is located for operation by a rider's left foot. The control includes a foot rest, or peg, and a shifter lever. As described in greater detail below, the shifter lever is movable to impart movement of a shift linkage for transmission control. As illustrated in FIG. 1A a rear brake control 130 is located for operation by a rider's right foot. The control includes a foot rest, or peg, and a brake lever. As described in greater detail below, the brake lever is movable to operate a brake master cylinder for a rear hydraulic brake.

Figure 2A:
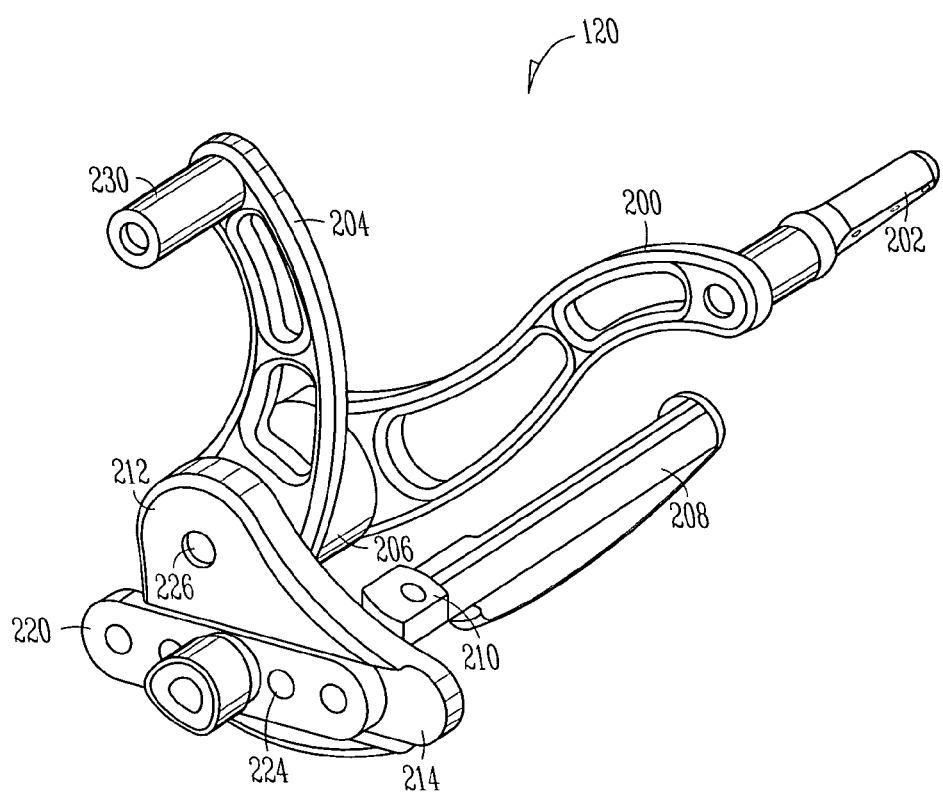
FIGS. 2A and 2B illustrate a gear shift assembly of an embodiment of the present invention.
Figure 2B:
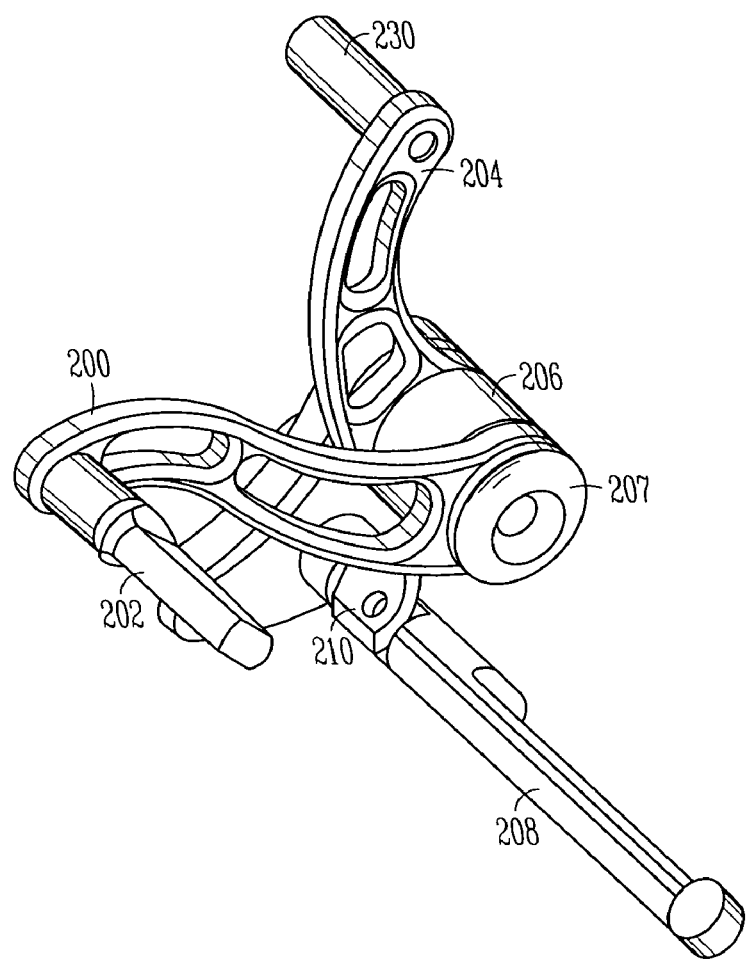

FIGS. 2A and 2B illustrate a gear shift foot control assembly 120 according to one embodiment of the present invention. In general the control includes a base plate 212, foot rest 208, gear shift lever 200 and shift linkage lever 204. It will be appreciated that the assembly can include additional features but has been simplified to focus on the inventive features. The gear shift lever 200 and shift linkage lever 204 are coupled together at a pivot location of the base plate. As such, movement of the shift lever imparts movement to the shift linkage lever. As known to those skilled in the art, the shift linkage is coupled to the motorcycle transmission via additional linkage (not shown) for selecting a transmission operating gear. In one embodiment, the shift lever and shift linkage lever are connected to the base plate at the pivot location with a threaded connector, such as a bolt 211.

The foot rest 208 is coupled to the base plate to provide support for a rider's foot. As known to motorcycle riders, the sole of the foot is supported by the foot rest and the top and bottom of the toes are used to move the shift lever. The foot rest is coupled to the base plate using a threaded connector that passes through the base plate 212 and treads into a stud 220 attached to the motorcycle frame 110. In one embodiment, the stud is rectangular in shape and is welded or integrally formed with the frame. The stud includes a plurality of threaded holes 224 to receive the threaded connector used to attach the foot rest. The threaded holes are spaced along the stud at pre-selected intervals, such as one-inch spacing. It will be understood that separate threaded connectors can be used to attach the foot rest to the base plate and to attach the base plate to the frame. A channel 214 formed in the back of the base plate 212 is sized to receive the stud 220 and allow the base plate to be laterally positioned.

Figure 4:
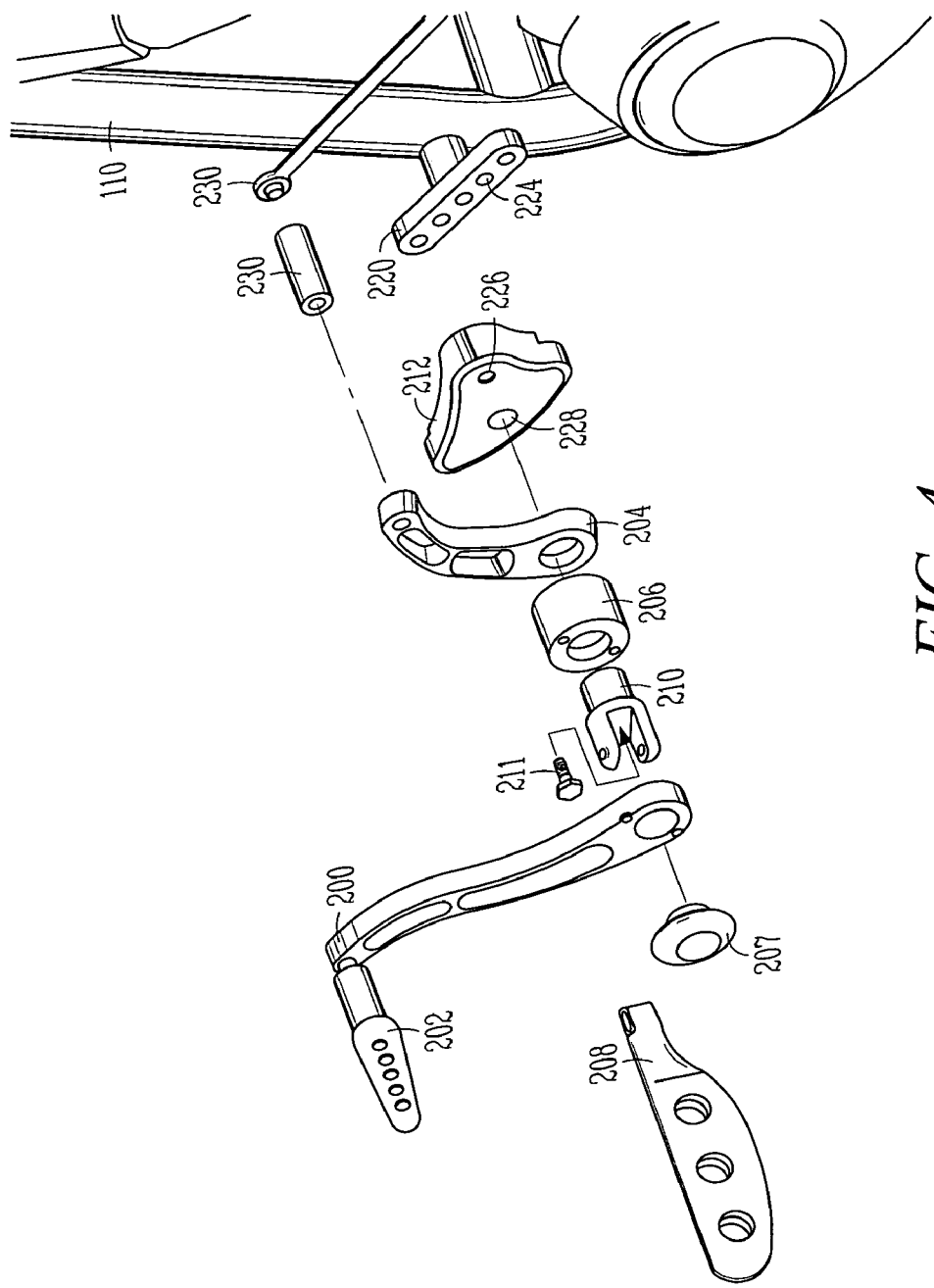
FIG. 4 is an exploded view of the gear shift assembly of FIGS. 2A and 2B.
Figure 5:
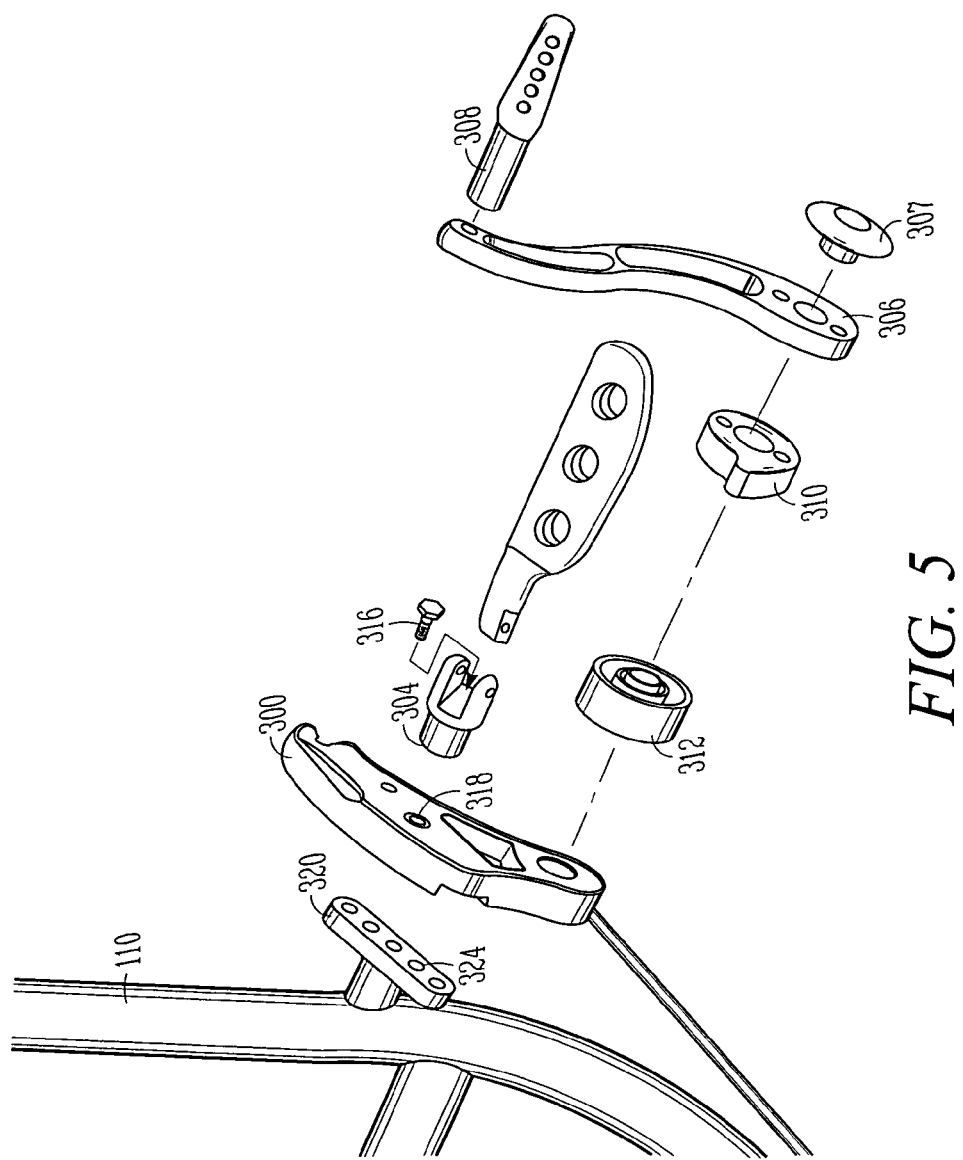
FIG. 5 is an exploded view of the brake control assembly of FIGS. 3A and 3B.

FIG. 4 is an exploded view of the gear shift foot control assembly of FIGS. 2A and 2B. A clevis 210 is provided to support the foot rest 208. The threaded connector 211, or bolt, passes through the clevis and hole 228 in the base plate 212 to thread into a selected hole 224 of the frame stud 220. The gear shifter comprises a toe peg 202, gear shift lever 200, shift linkage lever 204, a spacer coupler 206 and a cap 207. The gear shift lever 200 and shift linkage lever 204 are attached to the spacer coupler 206 to maintain a relative angular position between the levers. A bolt (not shown) passes through the cap 207 and the levers/coupler to thread into hole 226 of the base plate 212. The shift linkage lever is then coupled to the transmission shift linkage 230. The levers are free to rotate about the bolt to allow for movement of the transmission shift linkage.

To adjust the foot control 120, the threaded connector 211 holding the foot rest 208 and base plate 212 to the frame 110 is removed from a first hole 224 in the stud. The base plate is then laterally moved forward or backward by sliding the stud 220 along channel 214 to accommodate a rider. The threaded connector is then re-installed to a second hole in the stud to hold the base plate and foot rest in a new position. It will be understood that the angle of the stud relative to the motorcycle frame can be varied between motorcycle designs and is not limited to one embodiment. In addition, the shift linkage lever is not required to be adjusted when moving the base plate. If it is desired that the relative position between the foot rest and the gear shift lever remain constant, the shift linkage (not shown) can be adjusted for each position of the base plate.

Figure 3A:
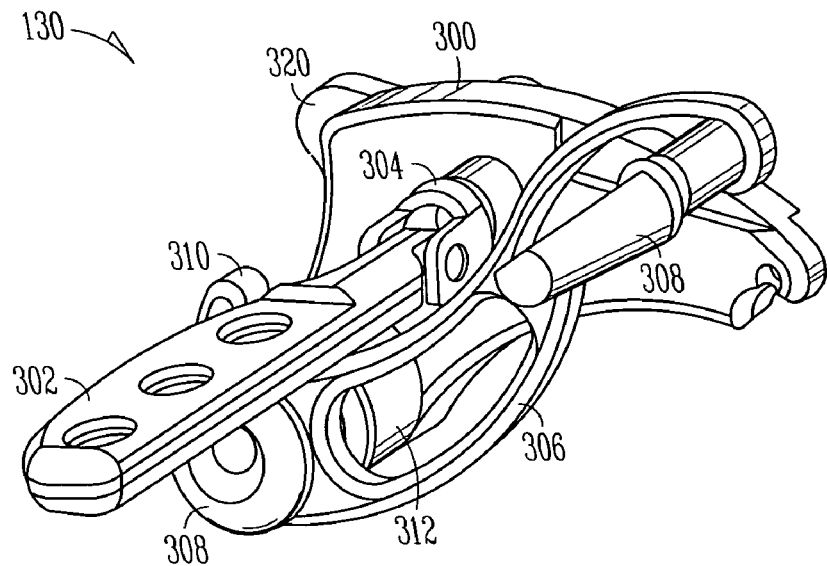
FIGS. 3A and 3B illustrate a brake control assembly of an embodiment of the present invention.
Figure 3B:
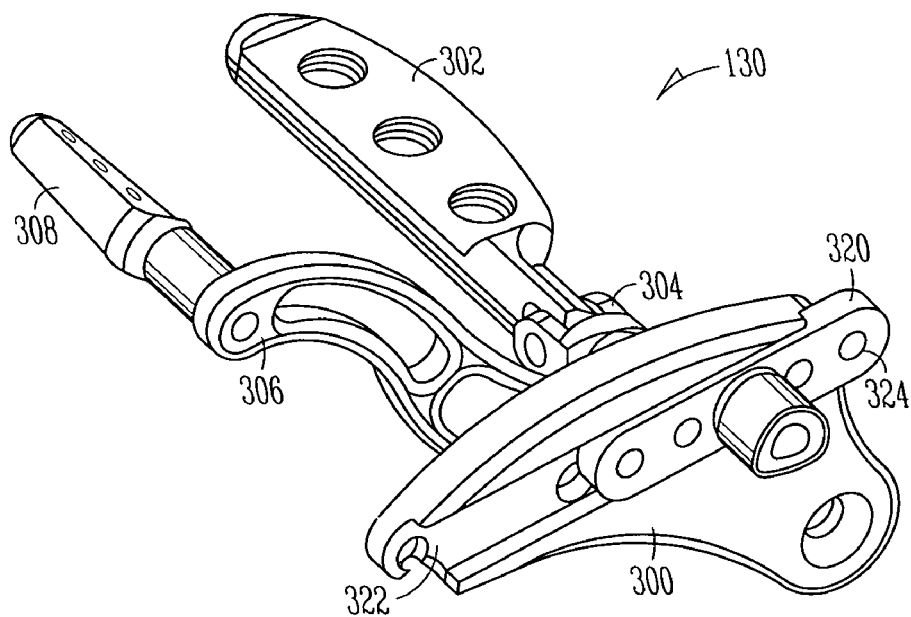

FIGS. 3A and 3B illustrate a rear brake foot control assembly 130 according to one embodiment of the present invention. In general the brake control assembly includes a base plate 300, foot rest 302 and brake pedal 308. The brake pedal is coupled to the base plate at a pivot location. As such, movement of the brake pedal is used to activate a rear brake of the motorcycle. In one embodiment, the brake pedal is connected to the base plate at the pivot location with a threaded connector 316, such as a bolt. It will be appreciated that the assembly can include additional features but has been simplified to focus on the inventive features.

As with the shifter assembly, the foot rest of the brake assembly is coupled to the base plate 300 to provide support for a rider's foot. As known to motorcycle riders, the sole of the foot is supported by the foot rest and the bottom of the foot is used to depress the brake pedal. The foot rest is coupled to the base plate using a threaded connector 316 that passes through the base plate 300 and treads into a stud 320 attached to the motorcycle frame 110. In one embodiment, the stud is rectangular in shape and is welded or integrally formed with the frame. The stud includes a plurality of threaded holes 324 to receive the threaded connector used to attach the foot rest. The threaded holes are spaced along the stud at pre-selected intervals, such as one-inch spacing. It will be understood that separate threaded connectors can be used to attach the foot rest to the base plate and to attach the base plate to the frame. A channel 322 formed in the back of the base plate 300 is sized to receive the stud 320 and allow the base plate to be laterally positioned.

FIG. 4 is an exploded view of the rear brake foot control assembly of FIGS. 3A and 3B. A clevis 304 is provided to support the foot rest 302. The threaded connector 316, or bolt, passes through the clevis and hole 318 in the base plate 300 to thread into a selected hole 324 of the frame stud 320. The brake pedal comprises a foot pedal (peg) 308, brake arm 306, actuator cam 310, rotation stop 312 and a cap 307. The foot pedal is connected to a first end of the brake arm 306. A second end of the arm is connected to the actuator cam 310. A bolt (not shown) passes through the arm 306, actuator cam 310 and into the rotation stop 312 and a second bolt (not shown) passes through hole 314 of the base plate 300 and into the other side of the rotation stop. The actuator cam 310 is coupled to a brake line and master cylinder (both not shown) to activate the rear brake of the motorcycle. In operation, the rotation stop helps control the degree of movement of the brake arm.

To adjust the foot control, the threaded connector 316 holding the foot rest 302, clevis 304 and base plate 320 to the frame stud 320 is removed from a first hole 324 in the stud. The base plate is then laterally moved forward or backward by sliding the stud along channel 322 to accommodate a rider. The threaded connector is then re-installed to a second hole in the stud to hold the base plate and foot rest in a new position. Again, it will be understood that the angle of the stud relative to the motorcycle frame can be varied between motorcycle designs and is not limited to one embodiment.

The assembly embodiments described above include a foot rest embodied as a peg-type rest extending from the base plate. In other embodiments, the foot rests can be a substantially flat floorboard-type design to provide additional support for the rider's feet. In this embodiment a connector(s) is used to hold the base plate to the frame. The connector can be common with the floor board or separate.

The above described embodiments illustrate grooves 214, 322, or channels, in the base plate and a stud sized to fit within the groove. It will be understood by those skilled in the art with the benefit of the present description that different inter-fitting designs can be used. For example, the base plate can include a stand-off stud that fits within a grove provide on the motorcycle frame. Alternately the base plate could have discrete recesses to accept the frame stud. As such, the present invention is not limited to a rectangular frame stud and elongated groove in the base plate. The interacting portions of the base plate and the frame are designed to provide stability to keep the assembly from twisting about the connection point to provide a high level of safety. One skilled in the art will appreciate that the foot controls described above can be fabricated from any suitable material, such as aluminum or steel.

The above description and drawings are to be considered illustrative of exemplary embodiments that achieve the features and advantages of the invention. Although exemplary embodiments of the present invention have been described and illustrated herein, many modifications, even substitutions of materials, can be made without departing from the invention. It is not intended that the invention be limited to the embodiments shown and described in detail herein. The invention is limited only by the scope of the appended claims.

What is claimed is:

1. A motorcycle comprising:
a frame having first and second studs;
a rear brake assembly comprising, a first base plate, a brake pedal attached to an outward side of the first base plate, and a first foot rest attached to the first stud via a first connector, the first foot rest is located on the outward side of the first base plate such that the first base plate is located between the first stud and the first foot rest, wherein the first base plate includes a first recess sized to accept the first stud to allow the first base plate to be selectively positioned relative to the frame; and a gear shift assembly comprising, a second base plate, a gear shift lever attached to an outward side of the second base plate, and a second foot rest attached to the second stud via a second connector, the second foot rest is located on the outward side of the second base plate such that the second base plate is located between the second stud and the second foot rest, wherein the second base plate includes a second recess sized to accept the second stud to allow the second base plate to be selectively positioned relative to the frame.

2. The motorcycle of claim 1 wherein the first and second connectors are threaded connectors.

3. The motorcycle of claim 1 wherein the first and second foot rests are pegs extending generally perpendicular to the outward side of the respective first and second base plates.

4. The motorcycle of claim 1 wherein the first and second studs are generally rectangular in shape and include a plurality of threaded holes sized to accept the first and second connectors, respectively, further wherein the first and second recesses are grooves sized to accept the generally rectangular first and second studs.

5. The motorcycle of claim 1 wherein the first and second studs are welded to the motorcycle frame.

* * * * *